(12) United States Patent
Nishio

(10) Patent No.: US 10,439,548 B2
(45) Date of Patent: Oct. 8, 2019

(54) SOLAR CELL MODULE AND SOLAR CELL ARRAY

(71) Applicant: KYOCERA CORPORATION, Kyoto (JP)

(72) Inventor: Yuta Nishio, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 191 days.

(21) Appl. No.: 15/630,813

(22) Filed: Jun. 22, 2017

(65) Prior Publication Data

US 2017/0294866 A1    Oct. 12, 2017

Related U.S. Application Data

(63) Continuation of application No. PCT/JP2015/086258, filed on Dec. 25, 2015.

(30) Foreign Application Priority Data

Dec. 26, 2014   (JP) ................................ 2014-263783

(51) Int. Cl.
     *H02S 20/23*      (2014.01)
     *H02S 30/10*      (2014.01)
     *E04D 13/04*      (2006.01)

(52) U.S. Cl.
     CPC .......... *H02S 20/23* (2014.12); *E04D 13/0445* (2013.01); *H02S 30/10* (2014.12); *Y02B 10/12* (2013.01)

(58) Field of Classification Search
     CPC ..... H02S 30/10; H02S 20/23; E04D 13/0445; Y02B 10/12
     See application file for complete search history.

(56) References Cited

U.S. PATENT DOCUMENTS 8,495,839 B2 *   7/2013   Tsuzuki ................. H02S 20/23
                                                            52/173.3

FOREIGN PATENT DOCUMENTS

| EP | 2431553 A1 | 3/2012 |
|---|---|---|
| JP | 2007-120054 A | 5/2007 |
| JP | 2013-157477 A | 8/2013 |
| JP | 2015-090967 A | 5/2015 |

OTHER PUBLICATIONS

International Search Report and Written Opinion dated Mar. 22, 2016 in counterpart Japanese Patent Application No. PCT/JP2015/086258 with Statement of Relevance of Non-English References.

* cited by examiner

*Primary Examiner* — Alfred Basichas
(74) *Attorney, Agent, or Firm* — Duane Morris LLP

(57) ABSTRACT

A solar cell module includes a solar panel and a protecting portion. The solar panel has first and second surfaces each having a rectangular shape. The protecting portion holds the solar panel along each of a first side and a second side of the solar panel that are opposed to each other, and exposes a third side of the solar panel except at end portions of the third side. The protecting portion includes first and second protecting members. The first protecting member sandwiches the first side from both the first and second surface sides to protect the first side. The second protecting member sandwiches the second side from both the first and second surface sides to protect the second side. The first and second sides each includes a portion located on an outer side of the solar panel than the third side in a first direction along the first side.

11 Claims, 8 Drawing Sheets

Ib-Ib

Ic

US 10,439,548 B2

SOLAR CELL MODULE AND SOLAR CELL ARRAY

CROSS-REFERENCE TO RELATED APPLICATION

The present application is a continuation based on PCT Application No. PCT/JP2015/086258 filed on Dec. 25, 2015, which claims the benefit of Japanese Application No. 2014-263783, filed on Dec. 26, 2014. PCT Application No. PCT/JP2015/086258 is entitled "SOLAR CELL MODULE AND SOLAR CELL ARRAY USING SAME", and Japanese Application No. 2014-263783 is entitled "SOLAR CELL MODULE AND SOLAR CELL ARRAY USING SAME". The contents of which are incorporated by reference herein in their entirety.

FIELD

Embodiments of the present disclosure relate generally to solar cell modules and solar cell arrays.

BACKGROUND ART

Solar cell modules need to be capable of maintaining the power generation efficiency.

One of the causes of low power generation efficiency of a solar cell module is soiling of a light receiving surface. For example, due to evaporation of rainwater on the light receiving surface of the solar cell module, sand and dust in the rainwater adhere to the glass and the like of the light receiving surface and block light accordingly, thereby reducing the power generation efficiency of the solar cell module. To cope with this, a solar cell module with improved antifouling property is proposed. There is a demand for a solar cell module that includes the light receiving surface with improved resistance to being soiled with, for example, sand and dust, and maintains the power generation efficiency accordingly.

SUMMARY

A solar cell module and a solar cell array are disclosed. In one embodiment, a solar cell array includes a solar cell panel, a protecting portion, and a holding member. The solar cell panel has a first surface, a second surface on a backside of the first surface, and a third surface connecting between the first surface and the second surface. The first and second surfaces each have a rectangular shape. The protecting portion holds the solar cell panel along each of a first side and a second side of the solar cell panel that are opposed to each other, in a plan view from the first surface side or the second surface side, and is located in such a manner that a side different from the first side and the second side of the solar cell panel is a third side that is exposed except at end portions thereof. The protecting portion includes a first protecting member and a second protecting member. The first protecting member is located along the first side and protects the first side in such a manner as to sandwich the first side from both the first surface side and the second surface side. The first protecting member includes a first portion located on an outer side of the solar cell panel than the third side in a first direction along the first side. The second protecting member is located along the second side and protects the second side in such a manner as to sandwich the second side from both the first surface side and the second surface side. The second protecting member includes a second portion located on an outer side of the solar cell panel than the third side in the first direction along the second side. The holding member holds the protecting portion. The holding member includes a first holding region, a second holding region, and a coupling region. In the first protecting region, the first portion is held. In the second holding region, the second portion is held. The coupling region is located along the third side to couple the first holding region and the second holding region. The coupling region is kept from contact with the solar cell panel.

In one embodiment, a solar cell module includes a solar cell panel and a protecting portion. The solar cell panel has a first surface, a second surface on a backside of the first surface, a third surface connecting between the first surface and the second surface. The first and second surfaces each have a rectangular shape. The protecting portion holds the solar cell panel along each of a first side and a second side of the solar cell panel that are opposed to each other, in a plan view from the first surface side or the second surface side, and is located in such a manner that a side different from the first side and the second side is a third side of the solar cell panel exposed except at end portions thereof. The protecting portion includes a first protecting member and a second protecting member. The first protecting member is located along the first side and protects the first side in such a manner as to sandwich the first side from both the first surface side and the second surface side. The first protecting member includes a first portion located on an outer side of the solar cell panel than the third side in a first direction along the first side. The second protecting member is located along the second side and protects the second side in such a manner as to sandwich the second side from both the first surface side and the second surface side. The second protecting member includes a second portion located on an outer side of the solar cell panel than the third side in the first direction along the second side.

DETAILED DESCRIPTION

A solar cell module and a solar cell array according to each embodiment of the present disclosure will now be described in detail with reference to the drawings. The drawings are schematic illustrations.

Figure 1A:
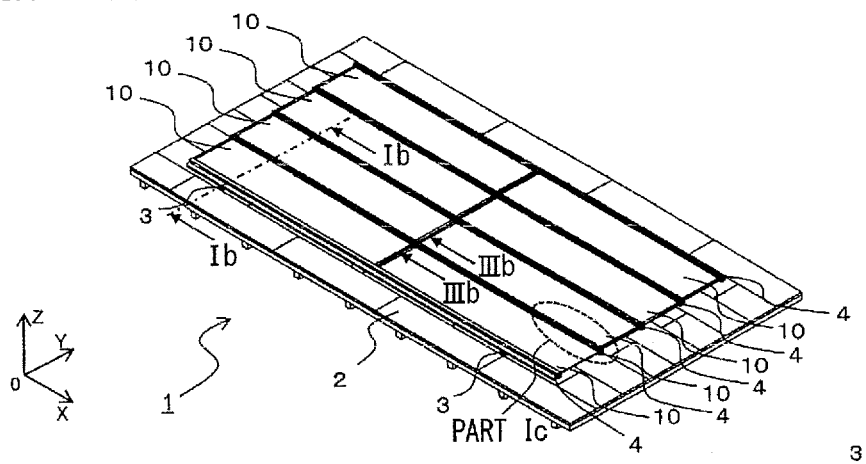
FIG. 1A schematically illustrates a perspective view of an example of the external appearance of a solar cell array according to a first embodiment of the present disclosure.
Figure 1B:
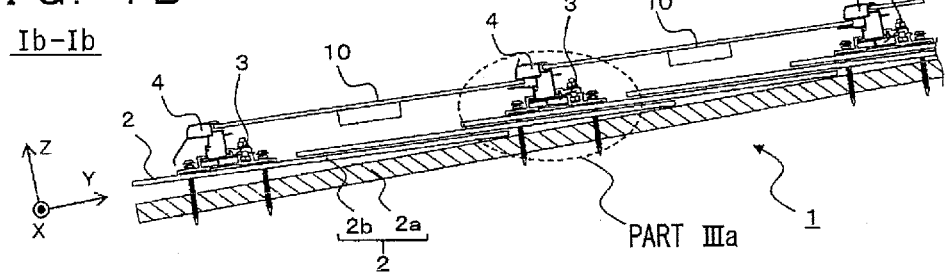
FIG. 1B schematically illustrates a cross section of the solar cell array along a line Ib-Ib of FIG. 1A.
Figure 1C:
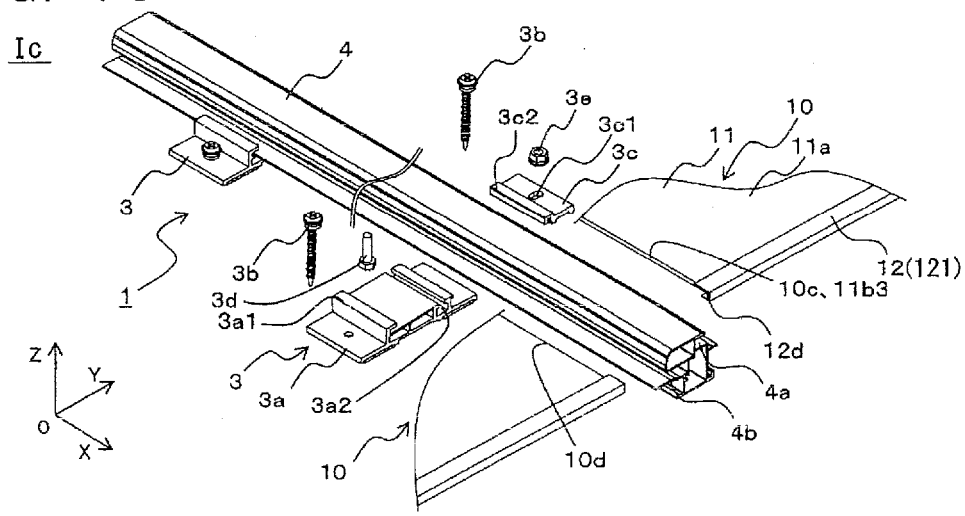
FIG. 1C illustrates an exploded perspective view of Part Ic of the solar cell array shown in FIG. 1A.

As illustrated in FIGS. 1A to 1C, a solar cell array 1 is fixed to, for example, a roof (installation surface) 2. The roof 2 includes, for example, a sheathing roof board 2a and a roofing material 2b fixed on the sheathing roof board 2a. The solar cell array 1 includes a plurality of fixing members 3, a plurality of holding members 4, solar cell modules 10 having rectangular shapes.

In the following description, the direction along one side of the individual solar cell module 10 in FIGS. 1A to 1C and parallel to the horizontal plane is referred to as the X direction, the direction parallel to the upper surface of the individual solar cell module 10 and orthogonal to the one side is referred to as the Y direction, and the direction orthogonal to both the X direction and the Y direction is referred to as the Z direction. In the following description, the position located on a perpendicular direction (a gravity direction) side may be expressed as being below and the position located on an opposite direction side to the gravity direction side may be expressed as being above. In the state in which the individual solar cell module 10 is installed on the inclined roof 2, the upward direction along the inclined roof 2 is referred to as the +Y direction and the downward direction along the inclined roof 2 (namely, an inclination lower direction or a first direction) is referred to as the −Y direction. As to the Z direction, the upward direction is referred to as the +Z direction and the downward direction is referred to as the −Z direction. The upper portion of the inclined roof 2 may be referred to as a ridge and the lower portion of the inclined roof 2 may be referred to as eaves.

«Solar Cell Modules»

Figure 2A:
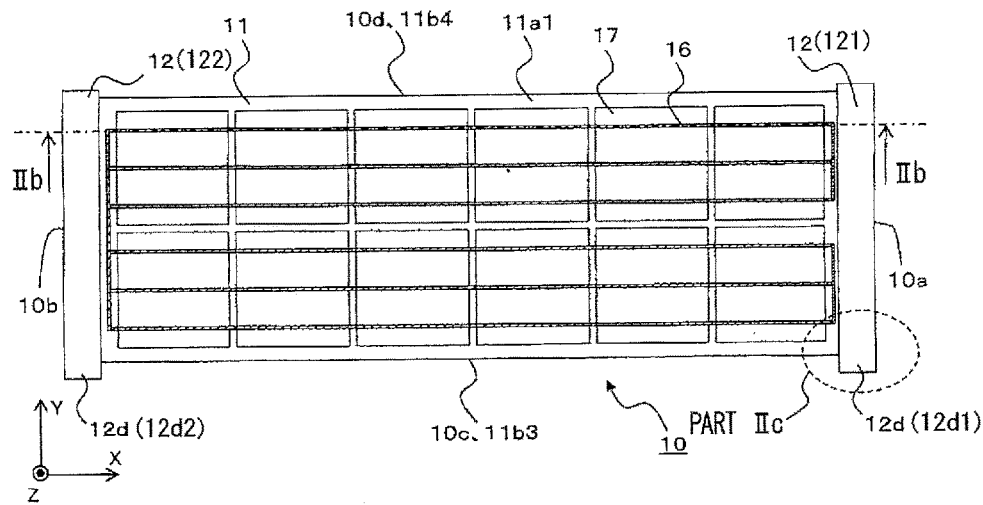
FIG. 2A schematically illustrates a plan view of an example of the external appearance of a solar cell module for use in the solar cell array according to the first embodiment of the present disclosure when seen from a first surface side.
Figure 2B:
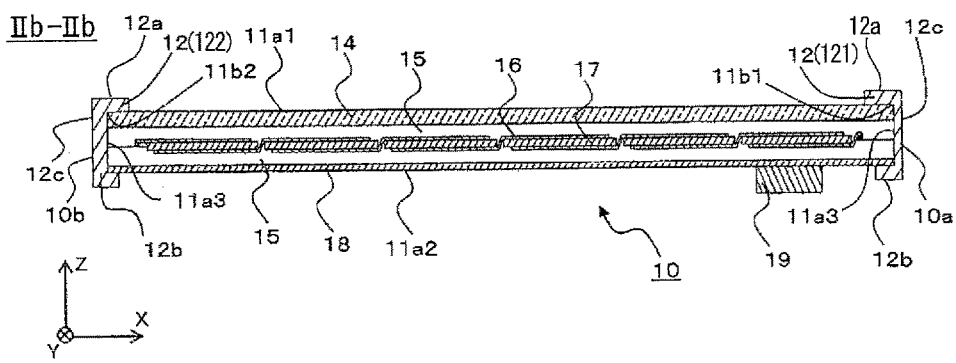
FIG. 2B schematically illustrates an example of a cross section of the solar cell module along a line IIb-IIb of FIG. 2A.
Figure 2C:
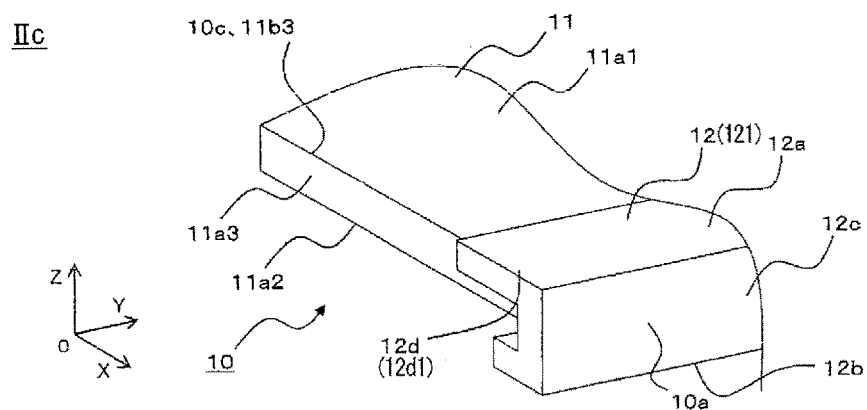
FIG. 2C schematically illustrates an enlarged perspective view of Part IIc of the solar cell module shown in FIG. 2A.

The solar cell modules 10 according to a first embodiment of the present disclosure will be described with reference to FIGS. 1A to 1C and FIGS. 2A to 2C. As illustrated in FIGS. 1A to 1C, a plurality of solar cell modules 10 are arranged along the X and Y directions. As illustrated in FIGS. 2A to 2C, the individual solar cell module 10 includes a solar cell panel 11 having a rectangular shape and a protecting portion 12 protecting a pair of opposed sides of the solar cell panel 11.

The solar cell panel 11 includes a first surface 11a1 (a surface thereof above a light-transmissive substrate 14) that mainly receives light and a second surface 11a2 (a surface thereof below a rear-surface protecting member 18) on the backside of the first surface 11a1. The solar cell panel 11 also includes a third surface 11a3 (regarded as a side surface of the solar cell panel 11) connecting between the first surface 11a1 and the second surface 11a2. When seen from the first surface 11a1 side, the solar cell panel 11 has a first side 11b1, a second side 11b2, a third side 11b3, and a fourth side 11b4. In the state in which the individual solar cell module 10 is installed so as to be inclined relative to the horizontal direction as illustrated in FIGS. 1A to 1C, the first side 11b1 and the second side 11b2 are located along the direction (the Y direction) in which the individual solar cell module 10 is inclined. The first side 11b1 and the second side 11b2 may be regarded as a pair of sides opposite to each other and a pair of opposed sides in the individual solar cell module 10. The third side 11b3 is located so as to connect between an end portion of the first side 11b1 and an end portion of the second side 11b2 of the roof 2 on the eaves side. The fourth side 11b4 is located so as to connect between an end portion of the first side 11b1 and an end portion of the second side 11b2 of the roof 2 on the ridge side. The third side 11b3 and the fourth side 11b4 are located along the X direction. In the first embodiment, each of the third side 11b3 and the fourth side 11b4 is longer than each of the first side 11b1 and the second side 11b2.

The protecting portion 12 is attached to the end portions of the solar cell panel 11 to protect the periphery of the solar cell panel 11. In the first embodiment, the protecting portion 12 includes a first protecting member 121 and a second protecting member 122. The protecting portion 12 covers and protects the first side 11b1 and the second side 11b2, namely, one pair of opposed sides of the solar cell panel 11. Specifically, the first protecting member 121 protects the first side 11b1 of the solar cell panel 11 in such a manner as to sandwich the first side 11b1 from both the first surface 11a1 side and the second surface 11a2 side. The second protecting member 122 protects the second side 11b2 of the solar cell panel 11 in such a manner as to sandwich the second side 11b2 from both the first surface 11a1 side and the second surface 11a2 side.

The third side 11b3 and the fourth side 11b4 of the solar cell panel 11 are exposed from the protecting portion 12. In the first embodiment, the third side 11b3 and the fourth side 11b4 are regarded as sides that are exposed (also referred to as exposed sides). The portion of the solar cell panel 11 on the exposed sides are not protected by the protecting portion 12, and thus, the light-transmissive substrate 14, the rear-surface protecting member 18, and the like, which will be described below, are left uncovered. In the following description, the portion of the solar cell module 10 on the first side 11b1 side is referred to as a first end portion 10a, the portion of the solar cell module 10 on the second side 11b2 side is referred to as a second end portion 10b, the portion of the solar cell module 10 on the third side 11b3 side is referred to as a third end portion 10c, and the portion of the solar cell module 10 on the fourth side 11b4 side is referred to as a fourth end portion 10d.

The solar cell panel 11 includes, for example, in the stated order from the first surface 11a1 side thereof, the light-transmissive substrate 14, which doubles as the substrate of the individual solar cell module 10, and one pair of sealers 15 made of thermosetting resin. The solar cell panel 11 also includes an inner lead 16 surrounded and protected by the pair of sealers 15 and a plurality of solar cell elements 17 electrically connected with each other via the inner lead 16. In addition, the solar cell panel 11 includes, for example, the rear-surface protecting member 18 protecting the rear surface of the individual solar cell module 10 and a terminal box 19 for emitting the output obtained by the solar cell elements 17 to the outside.

The light-transmissive substrate 14 has a rectangular shape when seen from, for example, the first surface 11a1 side, and has the function of protecting the sealers 15, the inner lead 16, and the solar cell elements 17. The light-transmissive substrate 14 may be made of, for example, tempered glass, white sheet glass, or the like.

The inner lead 16 has, for example, the function of establishing electric connection between the solar cell elements 17 adjacent to each other. Examples of the inner lead 16 include copper foil covered with solder for connection to the solar cell elements 17.

The sealers 15 have, for example, the function of sealing the solar cell elements 17, the inner lead 16, and the like. Examples of the sealers 15 include thermosetting resin such as transparent ethylene vinyl acetate (EVA) copolymer.

The rear-surface protecting member 18 has a rectangular shape when seen from, for example, the second surface 11a2 side, is the same size as the light-transmissive substrate 14, and has the function of protecting the sealers 15, the inner lead 16, and the solar cell elements 17 from the second surface 11a2 side. The rear-surface protecting material 18 may be made of, for example, polyethylene terephthalate (PET) resin or polyethylene naphthalate (PEN) resin.

The rear-surface protecting member 18 and the sealer 15 that is located between the solar cell elements 17 and the rear-surface protecting member 18 may be made of, for example, a light-transmissive material. In this case, the solar cell elements 17 may be configured to receive a part of light incident from the second surface 11a2 side.

The individual solar cell element 17 is, for example, a flat-shaped substrate made of, for example, monocrystalline silicon, polycrystalline silicon, or the like (also referred to as a crystalline silicon substrate). In this case, the inner lead 16 may be used, for example, to establish electric connection between the crystalline silicon substrates adjacent to each other, as mentioned above.

The solar cell elements 17 are not limited to a particular kind. For example, the individual solar cell element 17 may be a thin-film solar cell made of amorphous silicon, a copper indium gallium selenide (CIGS) solar cell, a cadmium telluride (CdTe) solar cell, or a solar cell including a crystalline silicon substrate and thin-film amorphous silicon formed on the substrate. For example, the solar cell elements 17 made of amorphous silicon, GIGS, and CdTe may include a structure in which transparent electrodes and the like and amorphous silicon layer, GIGS layer, or CdTe layer are combined and laminated on the light-transmissive substrate 14 appropriately.

The terminal box 19 includes, for example, a housing made of modified polyphenylene ether (modified PPE) resin or polyphenylene oxide (PPO) resin, a terminal plate located in the housing, and an output cable for emitting electric power to the outside of the housing.

The protecting portion 12 is located, for example, along the first side 11b1 and the second side 11b2, bonded to the sides via a silicone adhesive or the like, and has the function of protecting the first side 11b1 and the second side 11b2. For example, the first protecting member 121 is located along the first side 11b1, bonded to the first side 11b1 via a silicone adhesive or the like, and can protect the first side 11b1 accordingly. For example, the second protecting member 122 is located along the second side 11b2, bonded to the second side 11b2 via the silicone adhesive or the like, and can protect the second side 11b2 accordingly. The first protecting portion 121 and the second protecting portion 122 each includes an upper portion 12a located on the first surface 11a1 side, a lower portion 12b located on the second surface 11a2 side, and a side portion 12c connecting between the upper portion 12a and the lower portion 12b, and each have a C-shape section. The protecting portion 12 protects, for example, the entirety of the first side 11b1 and the second side 11b2. The first protecting member 121 protects, for example, the entirety of the first side 11b1. The second protecting member 121 protects, for example, the entirety of the second side 11b2. The first protecting portion 121 is located so as to be longer than the first side 11b1 in the Y direction. The second protecting portion 122 is located so as to be longer than the second side 11b2 in the Y direction. Specifically, for example, the first protecting member 121 includes, for example, a protruding portion 12d (also referred to as a first portion 12d1) protruding from the third side 11b3, which is exposed from the first protecting portion 121, toward the outside of the solar cell panel 11 in the −Y direction. For example, the second protecting member 122 includes a protruding portion 12d (also referred to as a second portion 12d2) protruding from the third side 11b3, which is exposed from the second protecting portion 122, toward the outside of the solar cell panel 11 in the −Y direction. The protecting portion 12 including the first protection portion 121 and the second protecting portion 122 mentioned above can be produced by, for example, aluminum extrusion molding.

«Solar Cell Array»

<First Embodiment>

The solar cell array 1 according to the first embodiment of the present disclosure will now be described. As illustrated in FIGS. 1A to 1C, the solar cell array 1 includes the plurality of fixing members 3, which are spaced and fixed on the roof 2 along the X direction, and the plurality of holding members 4 located on the fixing members 3. In the solar cell array 1, each of the plurality of solar cell modules 10 is held between the plurality of holding members 4 located along the Y direction at regular spacings.

As illustrated in FIGS. 1A to 1C and FIGS. 3A and 3B, the individual fixing member 3 includes a base 3a, wood screws 3b, a fastening plate 3c, a bolt 3d, and a nut 3e. The base 3a is a tabular member that is fastened on the roof 2 with the wood screws 3b and extends in the Y direction while holding the holding member 4 from the lower side. The base 3a includes an engaging portion 3a1 located on the −Y direction side and having a hook shape. On the +Y direction side, the base 3a has an opening 3a2 into which the top part of the bolt 3d is insetted. The opening 3a2 is located so as to extend in the X direction such that the bolt 3d is movable along the X direction. The fastening plate 3c is a member for fastening the holding member 4 mounted on the base 3a. The fastening plate 3c has a through-hole 3c1 through which the bolt 3d is inserted, and a retaining portion 3c2 sandwiching the holding member 4 and having a hook shape. The fastening plate 3c is fastened to the base 3a with both the bolt 3d fitted in the opening 3a2 and the nut 3e tightened on the fastening plate 3c. The base 3a and the fastening plate 3c can be produced by, for example, aluminum extrusion molding.

As illustrated in FIGS. 1A to 1C, the individual holding member 4 is a rod-shaped member holding the solar cell modules 10. The plurality of holding members 4, whose longitudinal sides extend along the X direction, are fixed so as to be arranged in parallel with each other in the Y direction. The holding members 4 are mounted on the plurality of fixing members 3 to be fixed thereto. The plurality of solar cell modules 10, whose lengths in total are in agreement with the length of the individual holding member 4 in the X direction, are fitted between a pair of holding members 4 opposed to each other in the Y direction. Thus, in the solar cell array 1, the plurality of solar cell modules 10 are arranged side by side along both the X direction and the Y direction.

As illustrated in FIG. 1C, the individual holding member 4 includes a first holding portion 4a open to the +Y direction and a second holding portion 4b open to the −Y direction. As illustrated in FIG. 1C, the third end portion 10c of the solar cell module 10 located on the ridge side relative to the holding member 4 is inserted into the space in an opening of the first holding portion 4a. The fourth end portion 10d of the solar cell module 10 located on the eaves side relative to the holding member 4 is inserted into the space in an opening of the second holding portion 4b.

Figure 3A:
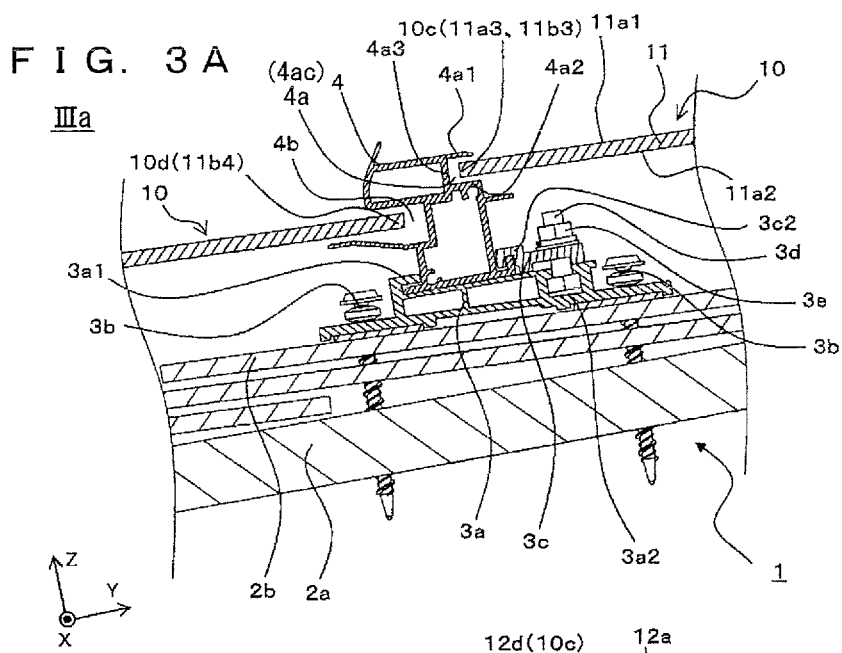
FIG. 3A schematically illustrates an enlarged cross-sectional view of Part IIIa being a part of the solar cell array.
Figure 3B:
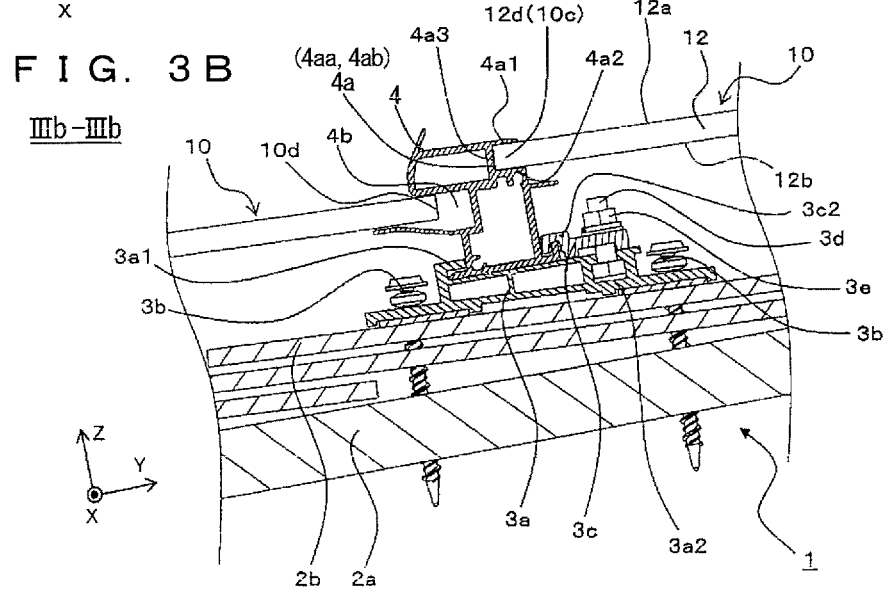
FIG. 3B schematically illustrates an example of a cross section of the solar cell array along a line IIIb-IIIb of FIG. 1A.

As illustrated in FIGS. 3A and 3B, when seen from the X direction, the first holding portion 4a includes a first wall portion 4a1 located on the +Z direction side and a second wall portion 4a2 located on the −Z direction side. The first holding portion 4a also includes a third wall portion 4a3 located on the inclination lower direction (−Y direction) side and connecting between the first wall portion 4a1 and the second wall portion 4a2. The first holding portion 4a is located so as to extend along the longitudinal direction of the third side 11b3. In the following description, the inner surface of the first holding portion 4a refers to surfaces of the first wall portion 4a1, the second wall portion 4a2, and the third wall portion 4a3 that face the solar cell panel 11.

In the solar cell array 1, the third end portion 10c is inserted into the space in the opening of the first holding portion 4a, thus being held by the first holding portion 4a. Specifically, the protruding portions 12d of the protecting portion 12 located on the third side 11b3 side (the third end portion 10c side) exposed from the protecting portion 12 are supported by the first holding portion 4a, so that the solar cell module 10 is held by the holding member 4. For example, the first holding portion 4a includes a region (also referred to as a first holding region) 4aa in which the first portion 12d1 being the protruding portion 12d of the first protecting member 121 is held, and a region (also referred to as a second holding region) 4ab in which the second portion 12d2 being the protruding portion 12d of the second protecting member 122 is held. Here, on the third end portion 10c side, the solar cell module 10 is loosely fitted in the first holding portion 4a. In this state, the first wall portion 4a1 and the upper portion 12a face each other. The second wall portion 4a2 and the lower portion 12b face each other. The third wall portion 4a3 and the tip of the protruding portion 12d on the −Y direction side face each other. Although at least the protruding portion 12d needs to be located in the space of the opening of the first holding portion 4a, portions other than the protruding portion 12d of the protecting portion 12, for example, may be located in the space of the opening of the first holding portion 4a as well.

The solar cell array 1 also includes a coupling region 4ac that extends along the third side 11b3 being the exposed side and couples the first holding region 4aa and the second holding region 4ab. The coupling portion 4ac is kept from contact with the solar cell panel 11.

In the following description, the first holding portion 4a in FIG. 3A corresponds to the coupling region 4ac, whereas the first holding portion 4a in FIG. 3B corresponds to the first holding region 4aa or the second holding region 4ab. The coupling region 4ac is a part of the first holding portion 4a along the third side 11b3 being the exposed side.

The first surface 11a1, the second surface 11a2, and the third surface 11a3 are apart from the inner surface of the coupling region 4ac on the third side 11b3 side of the solar cell panel 11. This means that there is a predetermined clearance between the inner surface of the coupling region 4ac and the solar cell panel 11. The clearance between the first wall portion 4a1 and the first surface 11a1 may be greater than the thickness of the upper portion 12a, and the clearance between the second wall portion 4a2 and the second surface 11a2 may be equal to the thickness of the lower portion 12b. The clearance between the third wall portion 4a3 and the third surface 11a3 may be equal to the length of the protruding portion 12d protruding from the third side 11b3. As illustrated in FIGS. 3A and 3B, the third side 11b3 being the exposed side is located in the space in an opening of the coupling region 4ac in the present embodiment. However, it is not always required that the third side 11b3 being the exposed side be located in, for example, space in the opening of the coupling region 4ac. This embodiment allows the solar cell array 1 to have improved function of draining water from the third side 11b3 side.

The length of the protruding portion 12d protruding from the third side 11b3 may be, for example, greater than the thickness of each of the upper portion 12a and the lower portion 12b and shorter than or equal to the length of the part of the solar cell panel 11 accommodated in the space in the opening of the first holding portion 4a. In this case, a flow path that does not constrict between the individual holding member 4 and each of the first surface 11a1, the second surface 11a2, and third surface 11a3 is provided almost without fail. Thus, rainwater and the like on the first surface 11a1 can be drained smoothly. In addition, when the individual solar cell module 10 is bent due to a wind load or a snow load, the third side 11b3 contacts the first wall portion 4a1 or the second wall portion 4a2 and can be held by the first wall portion 4a1 or the second wall portion 4a2.

In the case where each of the upper portion 12a and the lower portion 12b has a thickness of, for example, 1 mm or more, the space between the first wall portion 4a1 and the first surface 11a1 and the space between the second wall portion 4a2 and the second surface 11a2 are less likely to be clogged with sand and dust. In the case where each of the upper portion 12a and the lower portion 12b has a thickness of 3 mm, a large shadow is less likely to be cast over the first surface 11a1 of the solar cell panel 11.

In the individual solar cell module 10 according to the first embodiment, the third side 11b3 and the fourth side 11b4, except for the end portions thereof, are exposed from the protecting portion 12. In the case where the solar cell array 1 is obtained by inserting the protruding portion 12d into the first holding portion 4a, a clearance is formed such that the first surface 11a1, the second surface 11a2, and the third surface 11a3 are kept from contact with the inner surface of the coupling region 4ac on the third side 11b3 side of the solar cell panel 11. The individual solar cell module 10 can accordingly drain rainwater and the like on the first surface 11a1 through the above-mentioned clearance to the outside. The light-receiving surface (the first surface 11a1) of the individual solar cell module 10 becomes more resistant to soiling, and reduction in the power generation efficiency can be reduced accordingly.

The above-mentioned clearance extends along almost the entirety of the third side 11b3, and thus, the individual solar cell module 10 can drain rainwater efficiently. Thus, sand, dust, and the like on the first surface 11a1 can be washed out efficiently in an area with low precipitation. As a result, the build-up of the soiling on the first surface 11a1 can be reduced and the power generation efficiency of the solar cell module 10 can be maintained accordingly. The upper portion 12a, the lower portion 12b, and the protruding portion 12d can be usually designed, for engagement with the first holding portion 4a, to allow a slight clearance from the inner surface of the first holding portion 4a. The third side 11b3 being the above-mentioned exposed side is located as the lower side of the solar cell panel 11 in the inclination lower direction (−Y direction) of the solar cell panel 11. In the solar cell array 1, the above-mentioned clearance in the individual solar cell module 10 is located, for example, on a downstream side of the flow of the rainwater. The rainwater on the first surface 11a1 of the solar cell modules 10 can be drained smoothly.

In the individual solar cell module 10, the protecting portion 12 protrudes from the third side 11b3. The corner portions of the solar cell panel 11 can be protected accordingly. Thus, the light-transmissive substrate 14 and the like would be less susceptible to damage if, for example, the corner portions of the solar cell panel 11 bump into surrounding objects during, for example, the installation of the solar cell module 10.

The individual solar cell module 10 may have, for example, a rectangular shape, with the third side 11b3 and the fourth side 11b4 of the solar cell panel 11 being longer than the first side 11b1 and the second side 11b2 of the solar cell panel 11. This configuration can reduce the distance from the fourth side 11b4 to the third side 11b3 of the solar cell panel 11 in the solar cell array 1. The distance over which the rainwater flows on the first surface 11a1 of the solar cell panel 11 in the inclination lower direction (−Y direction) can be reduced accordingly. The amount of sand and dust adhering to the solar cell array 1 due to partial reduction in the amount of flow of rainwater can be reduced accordingly.

The length of the protruding portion 12d in the inclination lower direction (−Y direction) may be, for example, shorter than or equal to the length of a portion of the solar cell module 10 on the third side 11b3 side inserted into the space in the opening of the first holding portion 4a and accommodated therein in the inclination lower direction (−Y direction). When the individual solar cell module 10 is bent due to a wind load or a snow load, the third side 11b3 comes into contact with the inner surface of the first holding portion 4a and held thereby. Thus, the solar cell panel 11 is less likely to be damaged by the excessive bent.

Figure 4:
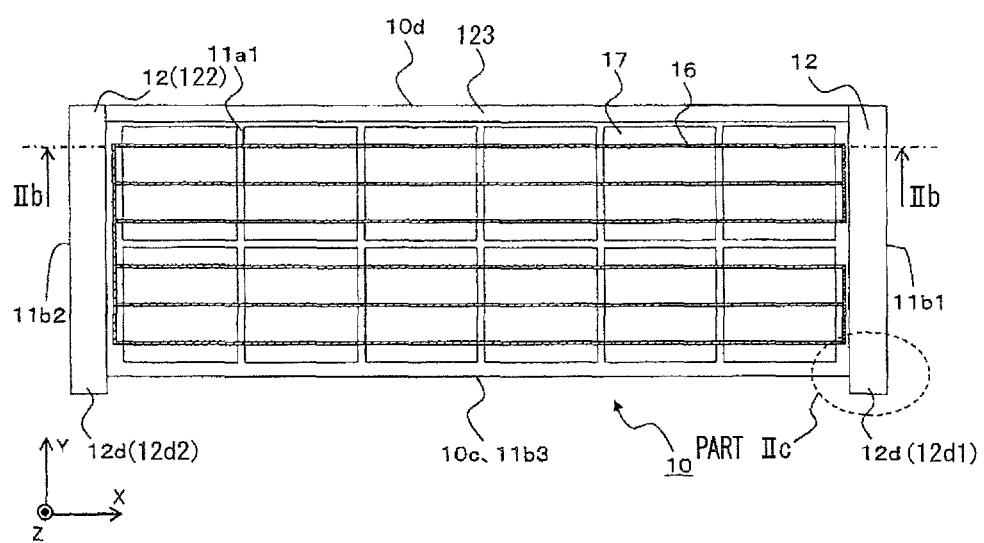
FIG. 4 schematically illustrates a plan view of another example of the external appearance of the solar cell module for use in the solar cell array according to the first embodiment of the present disclosure when seen from a first surface side.

The configuration of the individual solar cell module 10 is not limited to the above. As illustrated in FIG. 4, the protecting portion 12 may include a second protecting member 123 for holding the fourth side 11b4. In the case where the individual solar cell module 10 includes the second protecting member 123 for protecting the fourth side 11b4, the solar cell module 10 can have improved resistance to bending along the X direction. Thus, the solar cell module 10 is less likely to be vibrated by wind and the like, and can achieve noise reduction accordingly.

<Second Embodiment>

The difference between the first embodiment and a second embodiment is that the individual holding member 4 in the solar cell array 1 according to the second embodiment includes cutout portions 4c.

Figure 5:
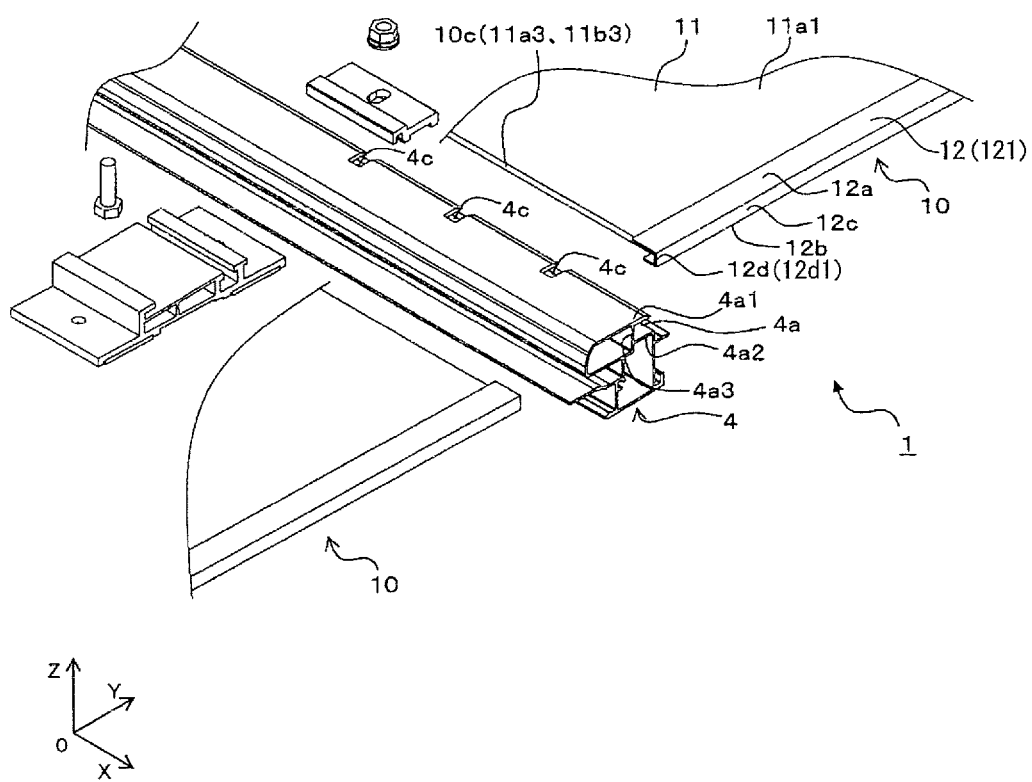
FIG. 5 schematically illustrates, out of a first example of the solar cell array according to a second embodiment of the present disclosure, an exploded perspective view of a part corresponding to the part shown in FIG. 1C.

In the second embodiment, as illustrated in FIG. 5, a part of the first wall portion 4a1 includes the cutout portions 4c that extend to the third wall portion 4a3 while exposing a part of the first surface 11a1 on the third side 11b3 side. In this case, when a large amount of rainwater flows over the first surface 11a1, rainwater close to the first wall portion 4a1 can be efficiently drained through the cutout portions 4c to the outside. This can reduce the amount of sand and dust adhering to the solar cell panel 11.

Figure 6A:
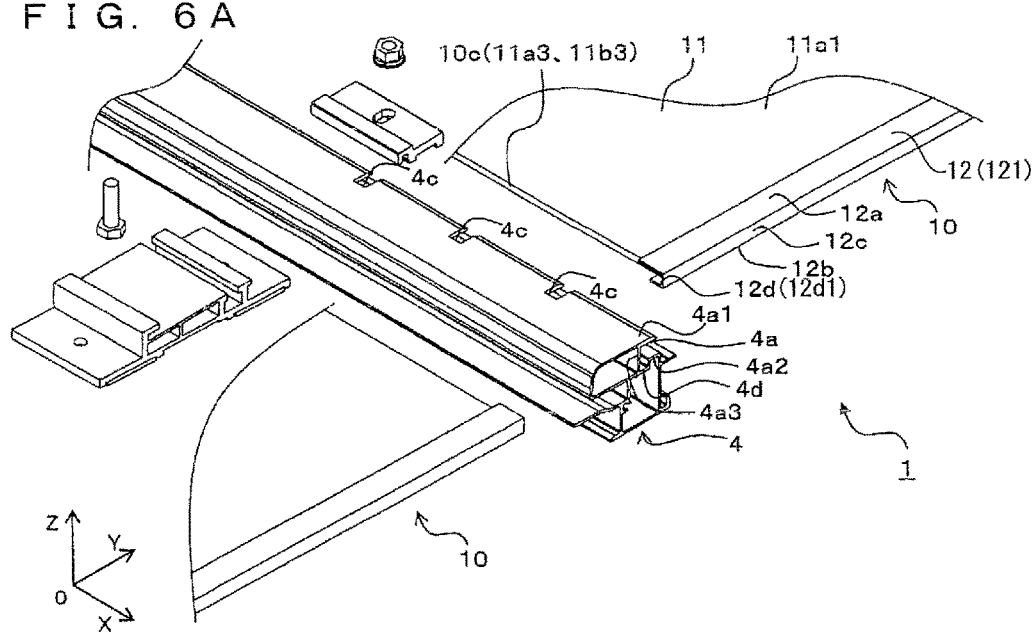
FIG. 6A illustrates, out of a second example of the solar cell array according to the second embodiment of the present disclosure, an exploded perspective view of a part corresponding to the part shown in FIG. 1C.
Figure 6B:
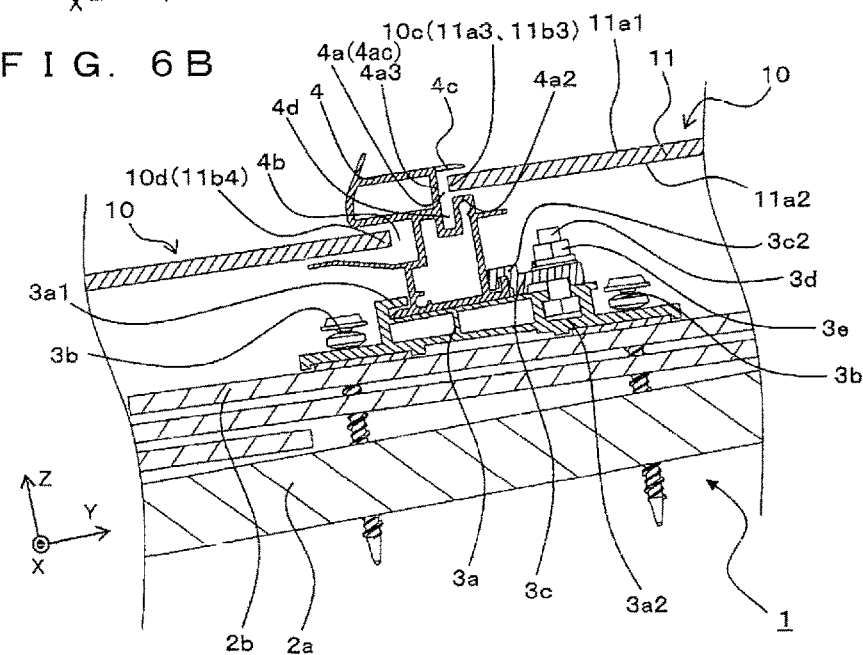
FIG. 6B schematically illustrates, out of the second example of the solar cell array according to the second embodiment of the present disclosure, a cross section of a part corresponding to the part shown in FIG. 3A.

As illustrated in FIGS. 6A and 6B, in the solar cell array 1, the second wall portion 4a2 facing the second surface 11a2 may include a groove portion 4d extending along the longitudinal direction (±X direction) of the individual holding member 4. The groove portion 4d may be located close to the third wall portion 4a3. The water flowing into the groove portion 4d is drained from the end portions of the individual holding member 4. Thus, a large amount of rainwater flowing over the first surface 11a1 can be efficiently drained through the groove portion 4d to the outside. This can reduce the amount of sand and dust adhering to the solar cell panel 11.

In the second embodiment, for example, the cutout portions 4c of the holding member 4 extend to the upper side of the groove portion 4d, and thus, the rainwater flowing over the first surface 11a1 can also flow into the groove portion 4d through the cutout portions 4c. The second embodiment adopts a structure with improved drainage of rainwater flowing over the first surface 11a1, so that sand and dust on the first surface 11a1 can be efficiently washed out. In the second embodiment, for example, rainwater flowing over the first surface 11a1 is less likely to be blocked at and around the end portions of the first wall portion 4a1 on the +Y direction side. The flow path (clearance) is less likely to be clogged with sand and dust accordingly.

Figure 7:
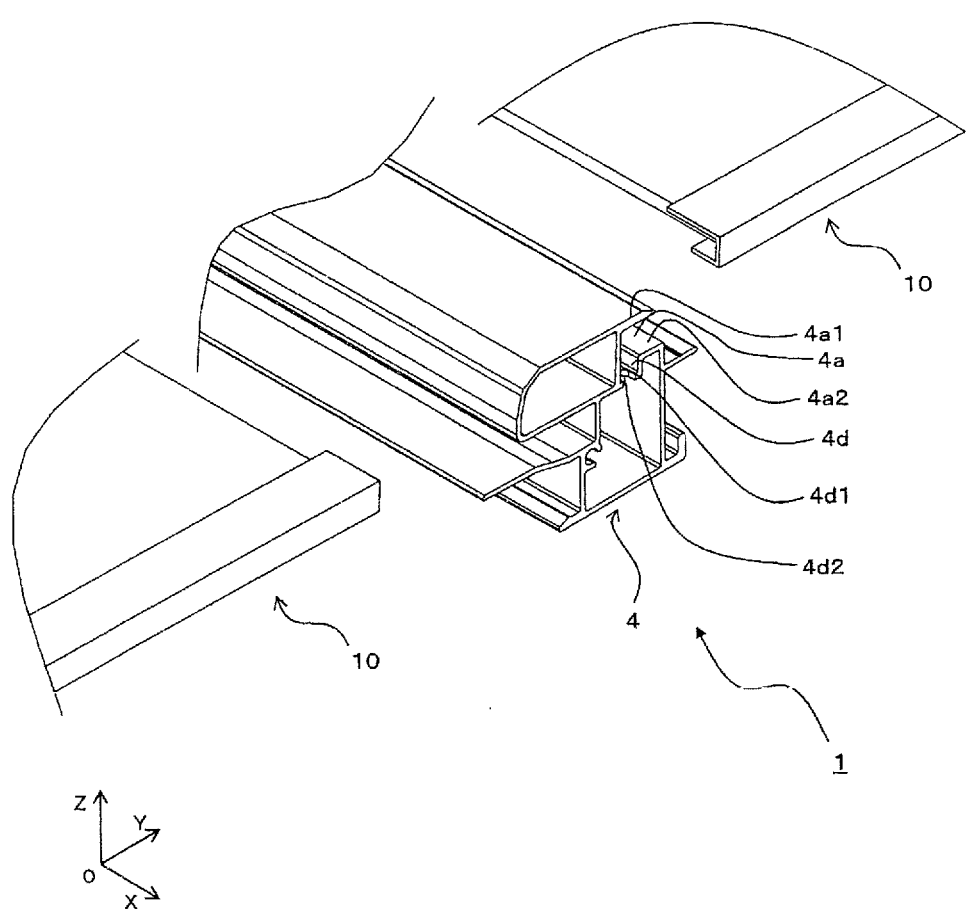
FIG. 7 schematically illustrates, out of a third example of the solar cell array according to the second embodiment of the present disclosure, an exploded perspective view of a part corresponding to the part shown in FIG. 1C.

As illustrated in FIG. 7, the groove portion 4d may include hole portions 4d2 penetrating through a bottom surface 4d1 of the groove portion 4d. For example, the rainwater flowing through the groove portion 4d can be drained through the hole portions 4d2 before reaching the end portions in the longitudinal direction (±direction) of the individual holding member 4. Thus, rainwater can be efficiently drained even in, for example, a heavy rain. The hole portions 4d2 are not limited to round holes and may be, for example, long holes or cutouts. The number and the size of the hole portions 4d2 need be set in a manner to, for example, avoid excessive reduction in the strength of the holding member 4.

<Third Embodiment>

The difference between the first embodiment and a third embodiment is that the solar cell array 1 according to the third embodiment includes conductive members 5 to establish electric connections between the individual holding member 4 and the protruding portion 12d. The protruding portion 12d may be the first portion 12d1 or the second portion 12d2.

Figure 8A:
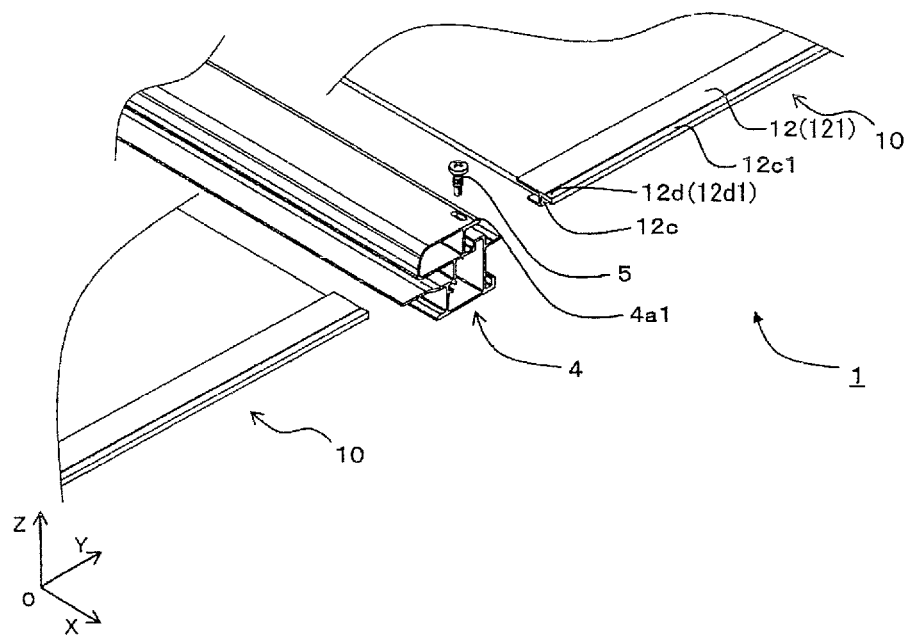
FIG. 8A schematically illustrates, out of an example of the solar cell array according to a third embodiment of the present disclosure, an enlarged and exploded perspective view of the part corresponding to the part shown in FIG. 1C.
Figure 8B:
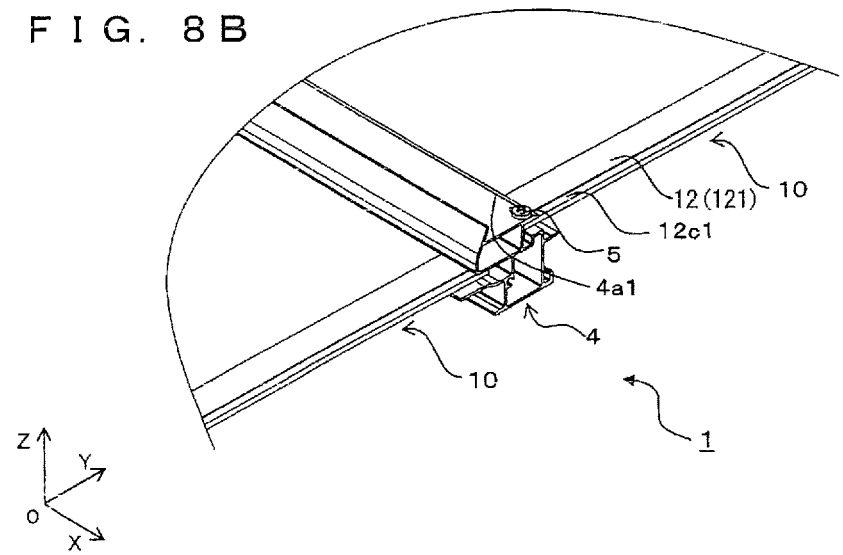
FIG. 8B schematically illustrates, out of one example of the solar cell array according to the third embodiment of the present disclosure, an enlarged perspective view of a part corresponding to the part shown in FIG. 1C.

As illustrated in FIGS. 8A and 8B, the protecting portion 12 in the third embodiment includes a rib 12c1 located so as to project from the side portion 12c toward the outside of the solar cell panel 11 in the direction parallel with the first surface 11a1. In the state in which the rib 12c1 is inserted in the first holding portion 4a of the individual holding member 4, the first wall portion 4a1 and the part of a rib 12c1 which is included in the protruding portion 12d protruding from the third side 11b3 to the outside of the solar cell panel 11 in the inclination lower direction are fastened together by the individual conductive member 5, thereby being electrically connected to each other. The conductive member 5 may be a screw having a drill-like tip. Thus, the holding members 4 and the solar cell modules 10 become electrically continuous with each other in a simple manner. The solar cell array 1 can be efficiently grounded accordingly.

As mentioned above, each embodiment of the present disclosure can provide solar cell modules 10 in which soiling with sand, dust and the like on the light receiving surface thereof can be reduced such that reduction in the power generation efficiency can be reduced, and a solar cell array 1 including the same.

The invention claimed is:

1. A solar cell array comprising:
    a solar cell panel having a first surface, a second surface on a backside of the first surface, and a third surface connecting between the first surface and the second surface, the first and second surfaces each having a rectangular shape;
    a protecting portion that holds the solar cell panel along each of a first side and a second side of the solar cell panel that are opposed to each other, in a plan view from the first surface side or the second surface side, and is located in such a manner that a side different from the first side and the second side of the solar cell panel is a third side that is exposed except at end portions thereof; and
    a holding member that holds the protecting portion, wherein
    the protecting portion includes a first protecting member located along the first side and protecting the first side in such a manner as to sandwich the first side from both the first surface side and the second surface side and a second protecting member located along the second side and protecting the second side in such a manner as to sandwich the second side from both the first surface side and the second surface side,
    the first protecting member includes a first portion located on an outer side of the solar cell panel and extending beyond the third side in a first direction along the first side,
    the second protecting member includes a second portion located on an outer side of the solar cell panel and extending beyond the third side in the first direction along the second side, and
    the holding member includes
        a first holding region in which the first portion is held,
        a second holding region in which the second portion is held, and
        a coupling region located along the third side to couple the first holding region and the second holding region, the coupling portion being kept from contact with a non-contact portion of the third side of the solar cell panel so as to provide a clearance between the non-contact portion of the third side and a inner surface of the coupling region, wherein the clearance is configured to capture and drain water flowing from the first surface of the solar cell panel.

2. The solar cell array according to claim 1, wherein the third side is longer than each of the first side and the second side.

3. The solar cell array according to claim 1, further comprising a third protecting member holding the solar cell panel along a fourth side other than the first to third sides of the solar cell panel.

4. The solar cell array according to claim 1, wherein the coupling region has, along the third side of the solar cell panel, a first inner surface opposed to the first surface, a second inner surface opposed to the second surface, and a third inner surface opposed to the third surface.

5. The solar cell array according to claim 1, wherein
    the holding member includes a first wall portion opposed to the first surface, a second wall portion opposed to the second surface, and a third wall portion located between the first wall portion and the second wall portion and opposed to the third surface, and
    a part of the first wall portion includes a cutout portion from which a part of the first surface located close to the third side is exposed, the cutout portion extending to the third wall portion.

6. The solar cell array according to claim 1, wherein the holding member includes a groove portion in a surface thereof opposed to the second surface of the solar cell panel.

7. The solar cell array according to claim 6, wherein the holding member includes a hole portion penetrating through a bottom surface of the groove portion.

8. The solar cell array according to claim 1, further comprising a conductive member that electrically connects the holding member to the first portion or the second portion.

9. A solar cell module comprising:
    a solar cell panel having a first surface, a second surface on a backside of the first surface, and a third surface connecting between the first surface and the second surface, the first and second surfaces each having a rectangular shape; and
    a protecting portion that holds the solar cell panel along each of a first side and a second side of the solar cell panel that are opposed to each other, in a plan view from the first surface side or the second surface side, and is located in such a manner that a side different from the first side and the second side of the solar cell panel is a third side that is exposed except at end portions thereof, wherein
    the protecting portion includes a first protecting member located along the first side and protecting the first side in such a manner as to sandwich the first side from both the first surface side and the second surface side and a second protecting member located along the second side and protecting the second side in such a manner as to sandwich the second side from both the first surface side and the second surface side
    the first protecting member includes a first portion located on an outer side of the solar cell panel and extending beyond the third side in a first direction along the first side, and
    the second protecting member includes a second portion located on an outer side of the solar cell panel and extending beyond the third side in the first direction along the second side, wherein the first and second portions are configured to engage a holding member, and a non-contact portion of the third side of the solar panel does not contact any other structures so as to provide a space configured to capture and drain water flowing from the first surface of the solar cell panel.

10. The solar cell module according to claim 9, wherein the third side is longer than each of the first side and the second side.

11. The solar cell module according to claim 9, further comprising a third protecting member holding the solar cell panel along a fourth side other than the first to third sides of the solar cell panel.

\* \* \* \* \*